(No Model.)  5 Sheets—Sheet 1.
F. E. TOWN.
DEVICE FOR COMPRESSING, BINDING, AND SECURING COTTON BALES.

No. 415,850. Patented Nov. 26, 1889.

(No Model.) 5 Sheets—Sheet 2.
F. E. TOWN.
DEVICE FOR COMPRESSING, BINDING, AND SECURING COTTON BALES.
No. 415,850. Patented Nov. 26, 1889.
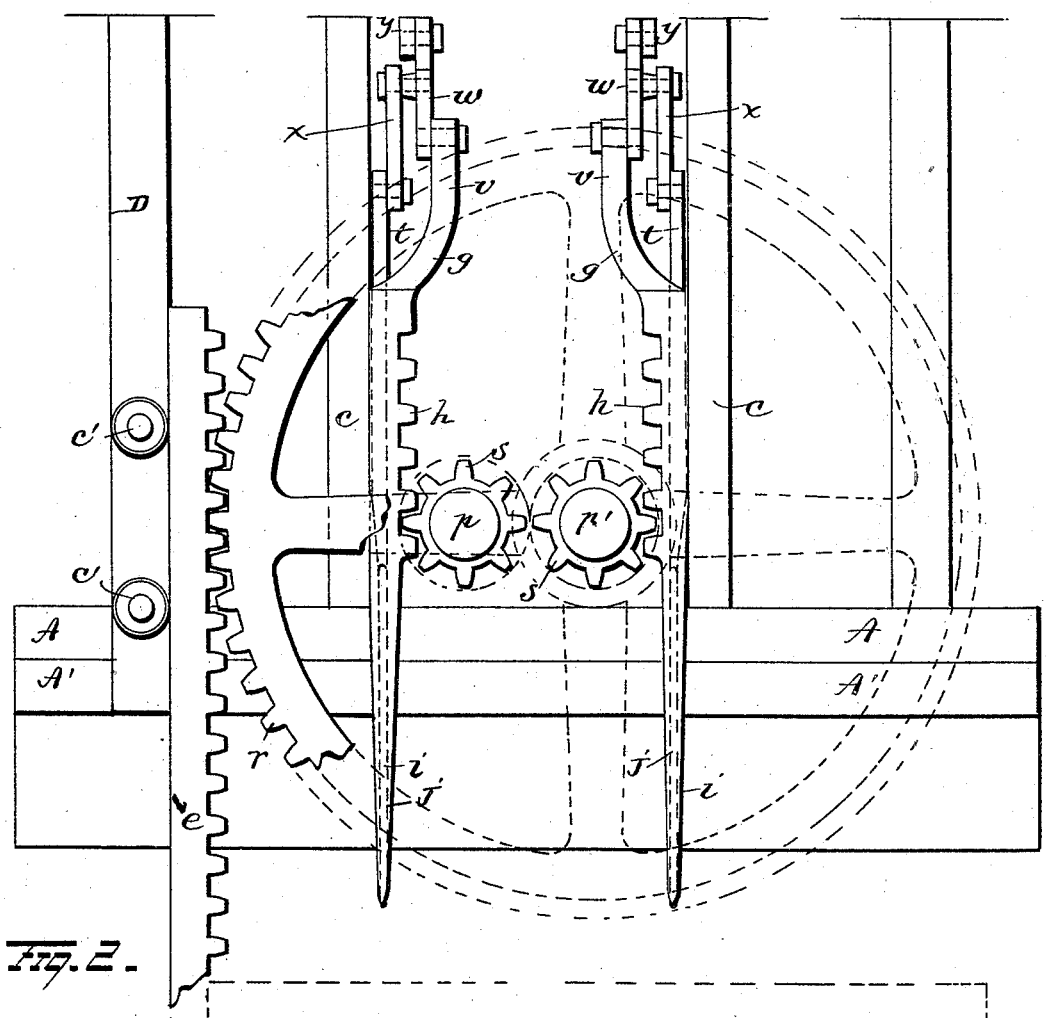
Fig. 2.
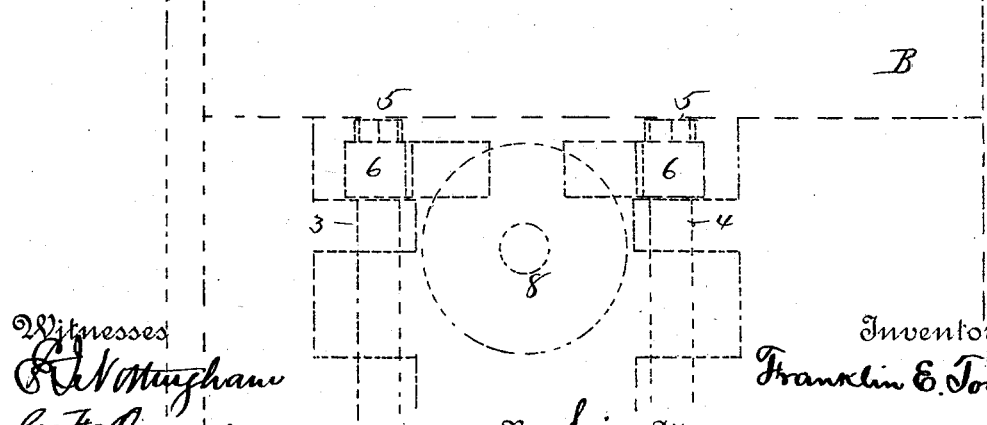
Witnesses
R. Nottingham
G. F. Downing
Inventor
Franklin E. Town
By his Attorney
H. A. Seymour (No Model.)  5 Sheets—Sheet 3.
F. E. TOWN.
DEVICE FOR COMPRESSING, BINDING, AND SECURING COTTON BALES.

No. 415,850. Patented Nov. 26, 1889.

Witnesses  Inventor
D. Nottingham  Franklin E. Town
G. F. Downing  By his Attorney
  H. A. Seymour (No Model.) 5 Sheets—Sheet 4.
F. E. TOWN.
DEVICE FOR COMPRESSING, BINDING, AND SECURING COTTON BALES.
No. 415,850. Patented Nov. 26, 1889.
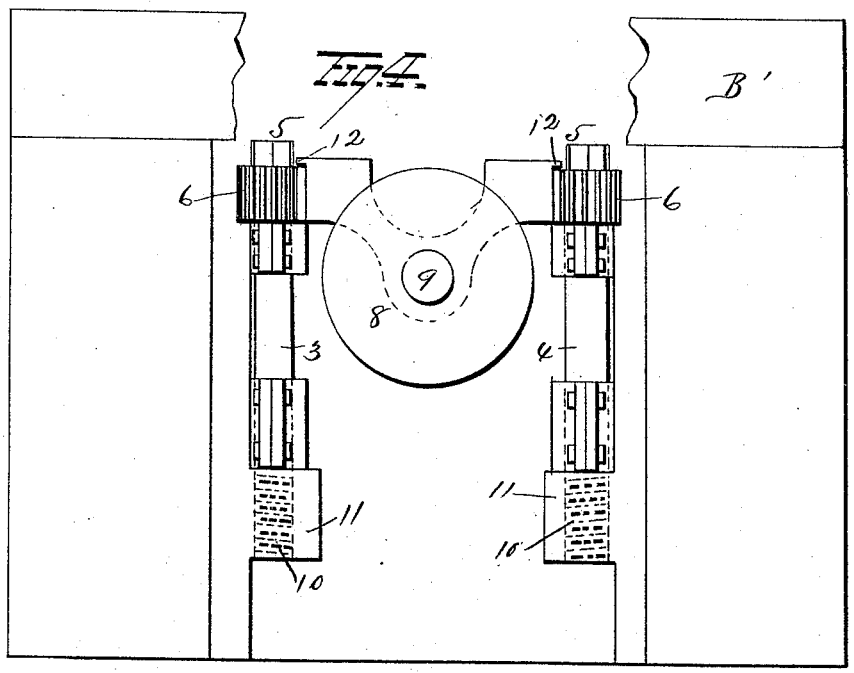
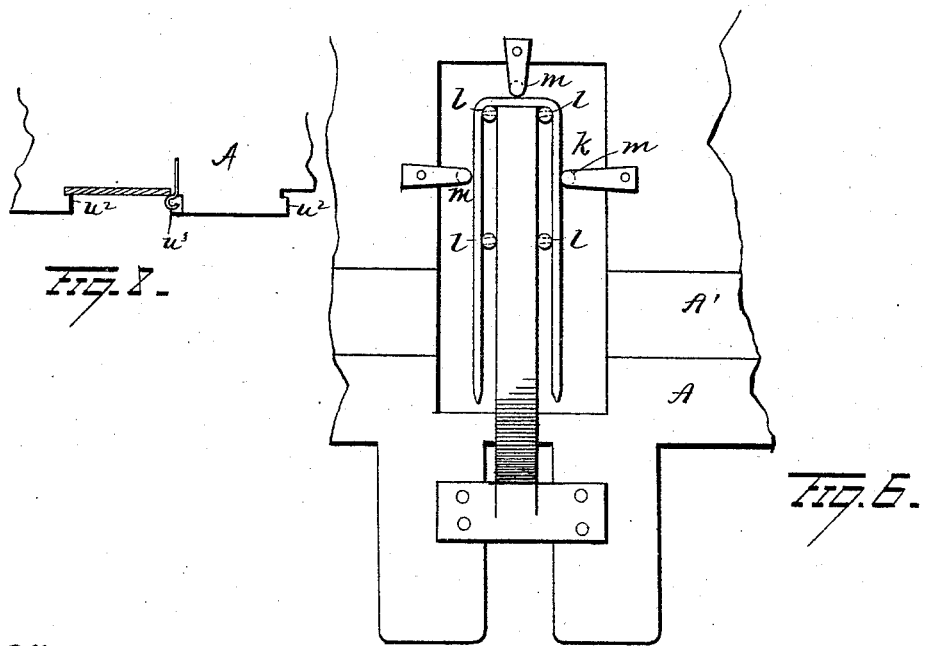

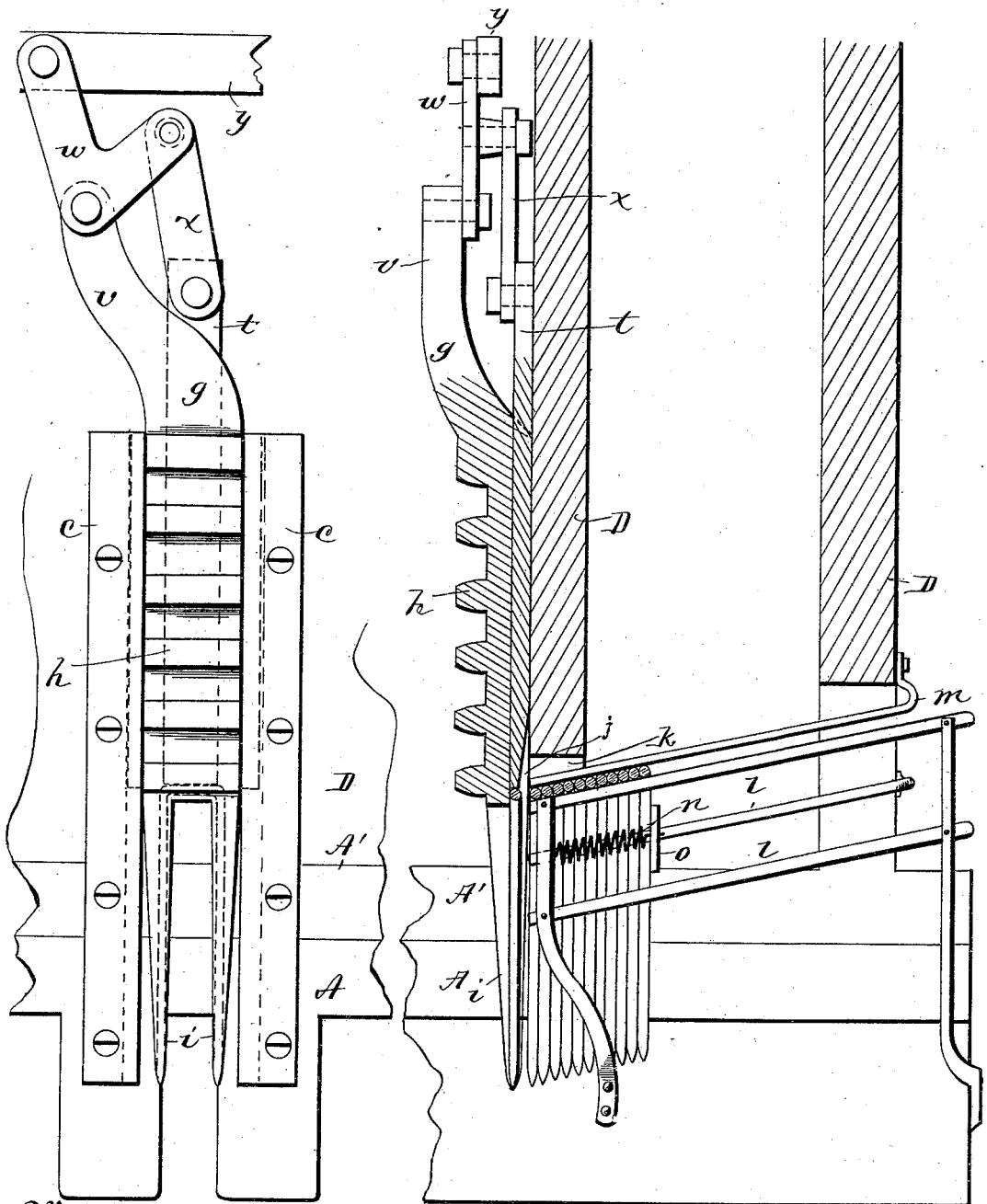

UNITED STATES PATENT OFFICE.

FRANKLIN E. TOWN, OF BEAUFORT, SOUTH CAROLINA.

DEVICE FOR COMPRESSING, BINDING, AND SECURING COTTON-BALES.

SPECIFICATION forming part of Letters Patent No. 415,850, dated November 26, 1889.

Application filed July 5, 1889. Serial No. 316,612. (No model.)

*To all whom it may concern:*

Be it known that I, FRANKLIN E. TOWN, of Beaufort, in the county of Beaufort and State of South Carolina, have invented certain new and useful Improvements in Devices for Compressing, Binding, and Securing Cotton-Bales; and I do hereby declare the following to be a full, clear, and exact description of the invention, such as will enable others skilled in the art to which it appertains to make and use the same.

My invention relates to an improvement in devices for compressing, binding, and securing cotton-bales in small compass.

The object of the invention is to provide a press with mechanism for binding a compressed bale of cotton in such manner that the bale will be securely retained against any undue expansion after it has been removed from the press, in order that it may be confined within as small dimensions as possible, and thus insure economy in transportation; and with these ends in view the invention consists in the combination, with a press, of devices for inserting through the bale a sufficient number of loops or staples, which embrace the bands or ties encircling the bale to prevent expansion of the bale by the yielding of said ties after the bale is removed from the press.

The invention further consists in the combination, with a cotton-press, of mechanism for forcing a staple through the bale and securing the free ends of the staple while the bale is under its maximum pressure.

The invention further consists in certain features of construction and combinations of parts, as will be hereinafter described, and pointed out in the claims.

Figure 1:
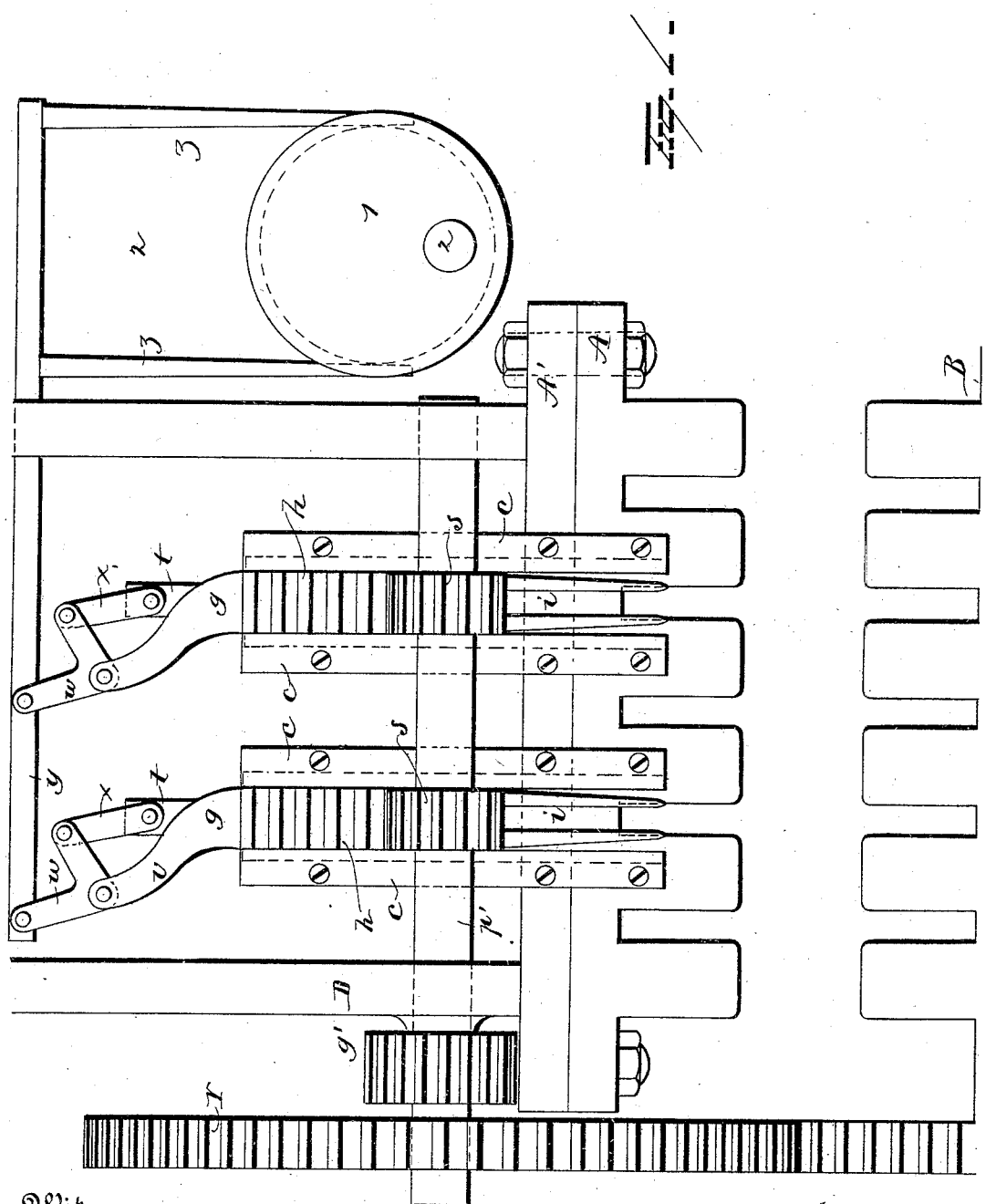
Figure 3:
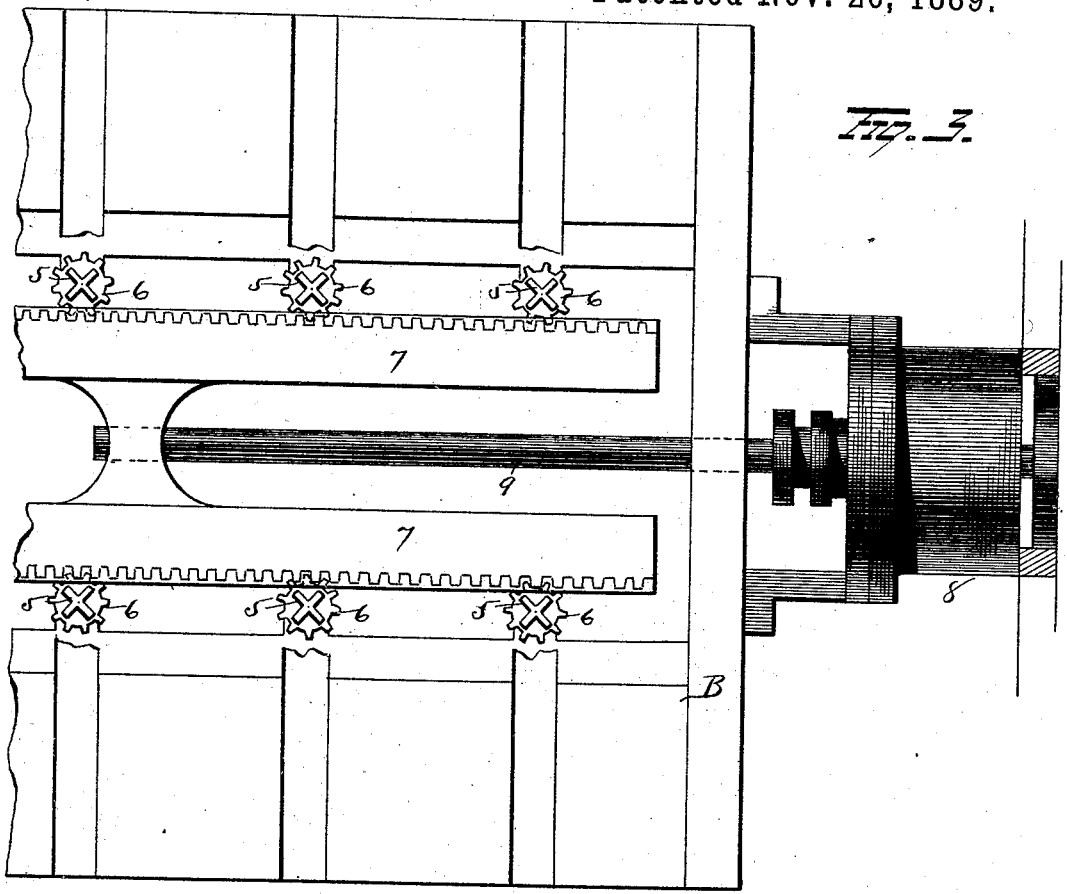
Figure 7:
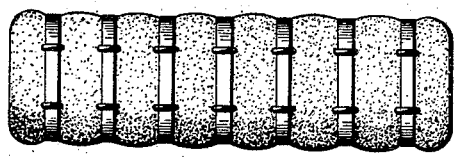

In the accompanying drawings, Figure 1 is a view in longitudinal section of the upper fixed platen, taken between the shafts $p\ p'$ of Fig. 2, showing my invention applied thereto. Fig. 2 is a view in transverse section of the same. Fig. 3 is a view in plan of the lower platen, portions thereof being broken away. Fig. 4 is a view in end elevation of the lower platen, the central portion thereof being broken away. Fig. 5 shows the staple-feeding devices in front elevation and in transverse section. Fig. 6 is a front view of the staple-supporting devices. Fig. 7 is a view of the bale, and Fig. 8 is a modification of the platen-face.

A represents the upper or fixed platen of the press, and B the lower or movable platen. Webs D are cast integral with the upper platen and are designed to stiffen and give rigidity to the head. The platens are bolted to the heavy cast-iron plates A' B', and they are channeled, as shown, across their adjacent faces, so as to exactly register with each other, in order to receive the ties or bands which are made to encircle the bales. Against the inside faces of the webs D guides $c$ are bolted or otherwise affixed to receive plungers $g\ g$ and guide them in their vertical movement. The latter are provided with rack-teeth $h$ on their inner faces, and their lower ends terminate each in a fork $i$, the tines of which are tapered and sharpened to pierce the cotton and are separated a distance about equal to the width of the channels for the purpose of receiving the bale ties or bands when they are inserted in the channels of the platens and secured around the bales. When the bale has been compressed to the utmost extent, the tines of the fork are pressed entirely through the bale, carrying the wire staples through with them. The ties or bands are then passed through the channels and staples and between the tines and fastened together in the usual manner. The forks are each provided with a groove or U-shaped recess $j$, which receives and holds the staples one at a time, and the following mechanism is devised to automatically feed the staples to the forks as fast as one is deposited in the bale: An opening $k$ is formed in the platen-plate back of the plungers large enough to admit the loops or staples. A frame of four wires $l$ extends through these openings, making a feed-slide on which the staples fit. The staples are held in this position by three outside wires $m$. These wires, on which the staples or loops are strung, are arranged on an incline which terminates against the flat face in the plunger. A coiled spring $n$, bearing gently against these staples by means of a button $o$, turned across the outside staple, feeds them to the plungers. When the plungers rise to their full height, each will receive one staple at a time, but no more, as the recess or groove $j$ is too shallow to receive more; but in passing down the next staple bears against the face of the plunger in readiness to enter the staple-groove $j$ in its turn, and so on, the spring always keeping a successor in readiness to enter the recess in the plunger.

It has been stated that the plungers are provided with rack-teeth $h$ on their inner faces. It should be stated also that the lower or movable platen B is provided with rack-bar $e$, the latter being so arranged that its back bears upon the rollers $c'$. Said rollers give support to the rack and prevent its springing out of position, and also diminish friction, and the following mechanism and gearing have been provided to simultaneously actuate the lower platen and the plungers in opposite directions: A pair of shafts $p\,p'$ extend side by side longitudinally through the machine, and these shafts are provided with pinions $g'$, geared together, one shaft being provided on its end with a large toothed gear-wheel $r$, which meshes with the teeth of the rack-bar $e$. Each shaft is provided with a number of pinions $s$, located back of the plungers and meshed with the teeth of their racks, whereby the plungers are reciprocated as the shafts are rotated.

The machine, when power is applied, raises the lower platen rapidly while the cotton is loose; but as the cotton becomes more compact the speed diminishes and the pressure increases, and as it becomes most compact the platen just moves, but with the greatest power, the plungers all the time moving down through the upper platen until finally, when the bale is sufficiently compressed, the press stops and holds the bale for tying. The plungers, coming down through the upper platen, will at this time have just pushed their points through the bale and the lower points of the loops or staples will be just flush with the face of the lower platen and will be a short distance above the bottom of the channels of the lower platen, and the top of the staple will be just at the top of the channel of the upper platen. The channels are now unobstructed and thus remain while the bands are being passed around the bales and fastened.

In this connection attention is called to the modification shown in Fig. 8, in which a change is made in the form of the platens, so that the bands may be placed therein before placing the bale in the press. The platen has a smooth or plain surface, and in place of the channels recesses are formed—say one-eighth inch deep—one edge of each having a lip $u^2$ to receive one edge of a band or tie. In the opposite side of this recess are springs $u^3$, which yieldingly support the other edge of the band. This support is only temporary, and the spring is so arranged that the spring-shoulder yields and permits the band to drop out of the channels with the application of very slight force. The advantage of this construction is that it prevents the cotton from squeezing into the channels, thus losing a great deal of the original pressure and compactness. This is saved by the use of the form of platen just described; but the staples or loops must now be inserted to their full length until they are stopped by their contact with the bands, and the means by which they are inserted independent of the other mechanism is as follows: Slides $t$ are located in the plungers, and they extend down to the grooves $j$ in position to bear against the staples. The plungers $g$ terminate at their upper ends in outwardly-curved arms $v$, and to the ends of said arms bell-crank levers $w$ are pivoted. Links $x$ connect one end of said bell-crank levers with the slides $t$, and a pitman $y$ is pivotally connected with the other ends of the bell-crank levers. On one end of the pitman a yoke $z$ is formed, and a cam 1, mounted on a rocking shaft 2, operates within this yoke, whereby the pitman is reciprocated and the slides forced down upon the staples, thereby pushing them down into the bale throughout their full extent. The cam-shaft may be rocked by a hand-lever or similar means. (Not shown.) The staples or loops being thus inserted around the bands, the following is a proposed form of mechanism for twisting their ends together on the lower side of the bale: In the lower platen two sets of spindles 3 and 4 are vertically arranged in alignment with each plunger. In the end of each of these spindles an X-shaped slot or socket 5 is formed, into the opposite ends of which the points of the wire staples or loops extend when forced down by the slides after the bale is tied. When the wire has entered this socket 5, the spindles are revolved sufficiently to twist the ends of the wire together to form a fastening. I will state here that I by no means confine myself entirely to this form of twister, as other forms—such as those common to grain-binders and similar machines—might be employed with equally good results. This revolution is effected by providing each spindle with a small pinion 6, which mesh with the teeth on the two edges of a horizontal rack-bar 7. This rack-bar, having teeth on both edges, operates both sets of spindles, one set to the right and the other to the left. The rack is driven through the instrumentality of a small steam-cylinder 8 or water-cylinder, as the case may be, which has its piston-rod 9 connected with the rack. As the piston returns it brings back the spindles to their original position. The cylinder is located in convenient position outside of the lower press-head, and steam, water, or their equivalent, are admitted and controlled by suitable valve mechanism (not shown,) or other means adequate to accomplish the results sought.

It will be apparent that if the ends of the wires to be twisted only just engage the sockets in the spindles when the wire is twisted together it would shorten up and pull out of the socket; hence to obviate this the spindle has a spline-connection within the pinion, which allows the spindle to rise and fall through the pinion, the latter being held in place by the flange on the sliding back. The lower ends 10 of the spindles are screw-threaded and work in nuts 11, which cause the spindles to rise just as much as the wire will "take up" during its revolution, and the reverse motion will bring it down again to its starting-point. The spur-wheels are kept from rising with the spindles by a flange 12 on the edge of the sliding rack, which overlaps the spur-wheel.

It is evident that slight changes might be resorted to in the form and arrangement of the several parts described without departing from the spirit and scope of my invention. Hence I do not wish to limit myself to the exact construction set forth; but, Having fully described my invention, what I claim as new, and desire to secure by Letters Patent, is—

1. In a press, the combination, with platens, of staple-inserting plungers carried by one of said platens, mechanism for moving said plungers, and devices carried by the other platen for bending the free ends of the staples, substantially as set forth.

2. In a press, the combination, with upper and lower platens, one of which is movable and the other stationary, of staple-inserting plungers mounted on the stationary platen and devices actuated by the movable platen for moving said plungers, substantially as set forth.

3. In a press, the combination, with upper and lower platens, staple-inserting plungers mounted on one of said platens, and devices for feeding staples to said plungers, of devices carried by the other platen for bending the free ends of the staples, substantially as set forth.

4. In a press, the combination, with platens, movable plungers carried by one of said platens, and gearing for actuating said plungers simultaneously, of slides located behind the plungers and adapted to bear against the staples, and mechanism for moving the slides independently of the plungers, substantially as set forth.

5. The combination, with platens and a series of plungers, of means for feeding staples to the plungers automatically, mechanism whereby the staples may be inserted independently of the plungers, and twisting devices for securing the ends of the staples together, substantially as set forth.

6. The combination, with a fixed and a movable platen and a series of plungers, of mechanism carried by one of said platens for actuating said plungers, a feed for supplying staples to the plungers, a slide for forcing the staples out of the plungers, and mechanism for operating the slides independently of the plungers, substantially as set forth.

7. The combination, with a fixed and a movable platen, of a series of forked plungers, the latter having recesses therein, and a feed for automatically supplying staples to said recesses, substantially as set forth.

8. The combination, with a fixed and a movable platen, of a series of forked plungers, the forks of the latter having recesses therein, a feed for automatically supplying staples to said recesses, and slides for removing the staples from the recesses, substantially as set forth.

9. The combination, with a fixed and a movable platen, a series of forked plungers, said plungers having recessed tines at one end, and rack-teeth and shafts and pinions for reciprocating the plungers, of mechanism for feeding staples to the recesses in the plungers and slides for removing the staples from the recesses, substantially as set forth.

10. The combination, with a fixed and a movable platen, a series of forked plungers, the latter having recessed tines at one end, and rack-teeth and shafts and pinions for reciprocating the plungers, of a rack-bar connected with the movable platen and means whereby said platen is moved simultaneously with the plungers, but in opposite direction therefrom, substantially as set forth.

11. The combination, with platens, of plungers, the latter having recesses for staples, and one of said platens having recesses for the staples, and wires or similar means for guiding the staples to the recesses in the plungers, substantially as set forth.

12. The combination, with a fixed and a movable platen having transverse grooves therein, of plungers, the latter having recesses for staples in their sides, and one of said platens having recesses for the staples, wires or similar means for guiding the staples to the recesses in the plungers, and springs in said recesses for feeding the staples to the recesses in the plungers, substantially as set forth.

13. The combination, with a fixed and a movable platen, of forked plungers, the forks having recesses therein for the reception of staples, and means for inserting said staples in the bales, of spindles having sockets therein and means for turning said sockets, substantially as set forth.

14. The combination, with a fixed and a movable platen, of recessed plungers, means for feeding staples thereto and inserting the staples in the bales, spindles, X-shaped sockets therein, a rack-bar for rotating the spindles and sockets, motive power for reciprocating the rack-bar, and means for permitting a vertical movement of the sockets, substantially as set forth.

15. The combination, with a press and plungers, of slides in said plungers, bell-crank levers connected with the slides, a pitman connecting the bell-crank levers, and a cam for moving the pitman, substantially as set forth.

In testimony whereof I have signed this specification in the presence of two subscribing witnesses.

FRANKLIN E. TOWN.

Witnesses:
A. E. HEIGHWAY,
A. S. BASCOMB.